US011715443B2

(12) United States Patent
Qu

(10) Patent No.: US 11,715,443 B2
(45) Date of Patent: Aug. 1, 2023

(54) DISPLAY BRIGHTNESS CONTROL APPARATUS AND ELECTRONIC DEVICE

(71) Applicant: Chipone Technology (Beijing) Co., LTD., Beijing (CN)

(72) Inventor: Kongning Qu, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/837,317

(22) Filed: Jun. 10, 2022

(65) Prior Publication Data

US 2022/0301520 A1 Sep. 22, 2022

Related U.S. Application Data

(63) Continuation of application No. PCT/CN2020/133070, filed on Dec. 1, 2020.

(51) Int. Cl.
*G09G 5/10* (2006.01)
*G06F 3/041* (2006.01)
*G09G 3/20* (2006.01)

(52) U.S. Cl.
CPC ........... *G09G 5/10* (2013.01); *G06F 3/04184* (2019.05); *G09G 3/2092* (2013.01);
(Continued)

(58) Field of Classification Search
CPC .................. G09G 5/10; G09G 3/2092; G09G 2300/0876; G09G 2354/00;
(Continued)

(56) References Cited

U.S. PATENT DOCUMENTS

2004/0032676 A1    2/2004   Drummond et al.
2009/0078853 A1    3/2009   Lin
(Continued)

FOREIGN PATENT DOCUMENTS

CN        1607561      4/2005
CN    101315475    12/2008
(Continued)

OTHER PUBLICATIONS

Extended European Search Report in European Appln. No. 20898471. 6, dated Nov. 25, 2022, 9 pages.
(Continued)

*Primary Examiner* — Antonio Xavier
(74) *Attorney, Agent, or Firm* — Fish & Richardson P.C.

(57) ABSTRACT

The present disclosure relates to display brightness control apparatuses and electronic devices. The display brightness control apparatus can be applied to a display panel. The display panel includes a thin film transistor unit and a light emitting unit. The display brightness control apparatus includes: a detector, which includes a plurality of thin-film transistors in the thin-film transistor unit and is used for outputting a detection current according to the brightness of ambient light; and a controller electrically connected to the detector and used for controlling the luminous brightness of the light-emitting unit according to the detection current. The detector is realized by means of the thin-film transistors, and is arranged inside the thin-film transistor unit of the display panel. The photosensitive characteristic of the thin-film transistors is used to detect the brightness of the ambient light.

13 Claims, 2 Drawing Sheets

(52) U.S. Cl.
CPC . *G09G 2300/0876* (2013.01); *G09G 2354/00* (2013.01); *G09G 2360/144* (2013.01)

(58) Field of Classification Search
CPC ....... G09G 2360/144; G09G 2320/029; G09G 2320/0626; G09G 2300/0809; G06F 3/04184
See application file for complete search history.

(56) References Cited

U.S. PATENT DOCUMENTS

| | | | |
|---|---|---|---|
| 2011/0102391 A1 | 5/2011 | Park et al. | |
| 2018/0218193 A1 | 8/2018 | Ding et al. | |
| 2019/0012967 A1 | 1/2019 | Lee et al. | |
| 2020/0201116 A1* | 6/2020 | Wang | G02F 1/133602 |

FOREIGN PATENT DOCUMENTS

| | | |
|---|---|---|
| CN | 101403828 | 4/2009 |
| CN | 101458121 | 6/2009 |
| CN | 101510396 | 8/2009 |
| CN | 101763805 | 6/2010 |
| CN | 102007607 | 4/2011 |
| CN | 102103843 | 6/2011 |
| CN | 104182098 | 12/2014 |
| CN | 105044952 | 11/2015 |
| CN | 106057137 | 10/2016 |
| CN | 108204859 | 6/2018 |
| JP | 2006243655 | 9/2006 |
| WO | 2021115158 | 6/2021 |

OTHER PUBLICATIONS

Office Action in Chinese Appln. No. 201911261303.8, dated Apr. 6, 2022, 18 pages (with English translation).

Office Action in Indian Appln. No. 202217039614, dated Dec. 23, 2022, 6 pages (with English translation).

PCT International Search Report and Written Opinion in International Appln. PCT/CN2020/133070, dated Mar. 1, 2021, 13 pages (With English Translation).

* cited by examiner

DISPLAY BRIGHTNESS CONTROL APPARATUS AND ELECTRONIC DEVICE

This present application is a continuation of and claims priority under 35 U.S.C. § 120 to PCT Application. No. PCT/CN2020/133070 filed on Dec. 1, 2020, which claims priority to Chinese Patent Application No. 201911261303.8 filed on Dec. 10, 2019, and entitled "DISPLAY BRIGHTNESS CONTROL APPARATUS AND ELECTRONIC DEVICE." All the above referenced priority documents are incorporated herein by reference in their entireties.

TECHNICAL FIELD

The present disclosure relates to the technical field of integrated circuits, and in particular to a display brightness control apparatus and an electronic device.

BACKGROUND

Electronic devices such as mobile phones include ambient light detectors that automatically adjust brightness of a display screen by detecting brightness of ambient light. The traditional ambient light detection is implemented by a photoelectric sensor at a front end of the mobile phone, which requires a separate sensor and compresses the space of other devices; moreover, when the display screen is a full screen, a special hollowing-out is required to place the photoelectric sensor. This may increase process complexity and reduce user experience.

SUMMARY

In view of the forgoing, the present disclosure provides a display brightness control apparatus, applied to a display panel, the display panel including a thin film transistor unit and a light emitting unit, the apparatus comprising:
a detection module, including a plurality of thin film transistors in the thin film transistor unit, and configured to output a detection current according to brightness of ambient light; and
a control module, electrically connected to the detection module, and configured to control luminous brightness of the light emitting unit according to the detection current.

In a possible implementation, the detection module includes one or more detection units, and to control the luminous brightness of the light emitting unit according to the detection current includes:
obtaining a first control signal according to the detection current outputted by the one or more detection units to control the luminous brightness of the light emitting unit.

In a possible implementation, the detection unit includes a first diode, a first capacitor, a second capacitor, a first switch, and a second switch, wherein
a negative end of the first diode is electrically connected to a first end of the first switch and a first end of the first capacitor, a second end of the first switch is electrically connected to a first end of the second switch and a first end of the second capacitor, a control end of the first switch, a control end of the second switch, and a second end of the second switch are electrically connected to the control module, and a positive end of the first diode, a second end of the first capacitor, and a second end of the second capacitor are grounded, and
the first diode includes a plurality of thin film transistors connected in parallel.

In a possible implementation, the control module includes a first operational amplifier, a third capacitor, a third switch, and a first control unit, wherein
a first input end of the first operational amplifier is electrically connected to a second end of the second switch, a first end of the third capacitor, and a first end of the third switch, a second input end of the first operational amplifier is used to input a reference signal, an output end of the first operational amplifier is electrically connected to a second end of the third capacitor, a second end of the third switch, and the first control unit, and a control end of the third switch is electrically connected to the first control unit;
the first control unit is configured to:
control on states of the first switch, the second switch, and the third switch through the control end of the first switch, the control end of the second switch, and the control end of the third switch, so as to control the detection unit to obtain the detection current; and
obtain the first control signal according to the detection current.

In a possible implementation, to control the on states of the first switch, the second switch, and the third switch through the control end of the first switch, the control end of the second switch, and the control end of the third switch so as to control the detection unit to obtain the detection current includes:
during a first time period when a detection starts, closing the first switch and the third switch, and opening the second switch; and
when the first time period is reached, closing the second switch, and opening the first switch and the third switch.

In a possible implementation, the detection unit includes a second diode, a third diode, a fourth switch, a fifth switch, a first transistor, and a second transistor, wherein
a positive end of the second diode is electrically connected to a first end of the fourth switch, and a second end of the fourth switch is electrically connected to a drain of the second transistor and the control module,
a positive end of the third diode is electrically connected to a first end of the fifth switch, and a second end of the fifth switch is electrically connected to a drain of the first transistor, a gate of the first transistor, and a gate of the second transistor,
a control end of the fourth switch and a control end of the fifth switch are electrically connected to the control module,
a negative end of the second diode, a negative end of the third diode, a source of the first transistor, and a source of the second transistor are grounded, and
the second diode and the third diode each includes a plurality of thin film transistors connected in parallel, and the third diode is arranged not to be irradiated by the ambient light.

In a possible implementation, the control module includes a second operational amplifier, a fourth capacitor, a sixth switch, and a second control unit, wherein
a first input end of the second operational amplifier is electrically connected to the second end of the fourth switch and a drain of the second transistor, a second input end of the second operational amplifier is used to input a reference signal, an output end of the second operational amplifier is electrically connected to a second end of the fourth capacitor, a second end of the sixth switch, and the second control unit, and a control end of the sixth switch is electrically connected to the second control unit;
the second control unit is configured to:
control on states of the fourth switch, the fifth switch, and the sixth switch through the control end of the fourth switch, the control end of the fifth switch, and the control end of the sixth switch, so as to control the detection unit to obtain the detection current; and obtain the first control signal according to the detection current.

In a possible implementation, to control the on states of the fourth switch, the fifth switch, and the sixth switch through the control end of the fourth switch, the control end of the fifth switch, and the control end of the sixth switch so as to control the detection unit to obtain the detection current includes:

during a second time period when a detection starts, closing the sixth switch, and opening the fourth switch and the fifth switch; and when the second time period is reached, closing the fourth switch and the fifth switch, and opening the sixth switch.

In a possible implementation, the control module is arranged in any one chip of a touch and display driver integration (TDDI), a fingerprint touch and display driver integration (FTDDI), or a fingerprint and display driver integration (FDDI).

According to another aspect of the present disclosure, there is provided an electronic device, comprising:

the display brightness control apparatus; and
a display panel.

In a possible implementation, the display panel includes at least one of a liquid crystal display panel, a light-emitting diode display panel, an organic light-emitting diode display panel, or a microlight-emitting diode display panel.

In a possible implementation, the micro light-emitting diode display panel includes a Mini LED or a Micro LED.

In various aspects of the embodiments of the present disclosure, the detection module is implemented by the thin film transistors and is arranged in the thin-film transistor unit of the display panel, and the photosensitive characteristic of the thin film transistors is used to detect the brightness of the ambient light. Thus the occupied space is small, and a hollowing-out is not required in the case of a full screen, such that the process complexity is low. Compared with the related technology, the present disclosure has the characteristic of low cost, and can improve user experience.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate exemplary embodiments, features and aspects of the present disclosure together with the specification, and serve to explain the principles of the present disclosure.

DETAILED DESCRIPTION

Figure 1:
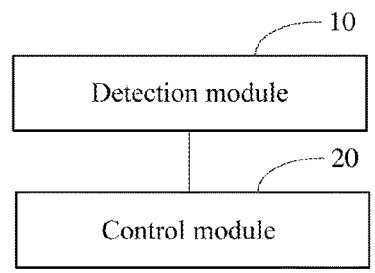
FIG. 1 shows a block diagram of a display brightness control apparatus according to an embodiment of the present disclosure.

Hereinafter, various exemplary embodiments, features and aspects of the present disclosure will be described in detail with reference to the accompanying drawings. In the drawings, like reference numerals refer to elements with the same or similar functions. Although various aspects of the embodiments are shown in the figures, the figures are not necessarily drawn to scale unless otherwise specified.

The special word "exemplary" here means "serving as an example, embodiment or illustration". Any embodiment described herein as "exemplary" need not be interpreted as superior to or better than other embodiments.

In addition, in order to better describe the present disclosure, numerous specific details are provided in the following detailed embodiments. It is understood by those skilled in the art that the present disclosure can also be practiced without certain specific details. In some embodiments, methods, means, elements, and circuits well known to those skilled in the art are not elaborated in order to highlight the main idea of the present disclosure.

Please refer to FIG. 1 which shows a block diagram of a display brightness control apparatus according to an embodiment of the present disclosure.

The display brightness control apparatus can be applied to a display panel, and the display panel includes a thin film transistor unit and a light emitting unit. As shown in FIG. 1, the apparatus comprises:

a detection module 10, including a plurality of thin film transistors (TFT) in the thin film transistor unit, and configured to output a detection current according to brightness of ambient light; and a control module 20, electrically connected to the detection module 10, and configured to control luminous brightness of the light emitting unit according to the detection current.

In the display brightness control apparatus provided by an embodiment of the present disclosure, the detection module is implemented by the thin film transistors and is arranged in the thin-film transistor unit of the display panel, and the photosensitive characteristic of the thin film transistors is used to detect the brightness of the ambient light. Thus the occupied space is small, and a hollowing-out is not required in the case of a full screen, such that the process complexity is low. Compared with the related technology, the present disclosure has the characteristic of low cost, and can improve user experience.

A specific type of the display panel is not limited by the present disclosure. The display panel may be a self-luminous type display panel, or may be a backlight type display panel, which may be selected by those skilled in the art as needed.

In an example, the display panel may be the self-luminous type display panel, e.g., an organic light emitting diode (OLED) display panel. In this case, the light emitting unit may refer to the display panel itself, and the control module 20 may control the luminous brightness of the display panel according to the detection current; the thin film transistor unit may include a plurality of thin film transistors arranged on a substrate.

In an example, the display panel may be the backlight type display panel, e.g., a liquid crystal display panel. In this case, the light emitting unit may refer to a backlight layer in the display panel, and the control module 20 may control the luminous brightness of the backlight layer according to the detection current; the thin film transistor unit may include a plurality of thin film transistors arranged on a substrate.

The display panel may be arranged in an electronic device. The electronic device may also be referred to as a mobile equipment, which may be various forms of access mobile equipment, subscriber unit, user equipment, subscriber station, rover station, Mobile Station (MS), remote station, remote mobile equipment, mobile equipment, user mobile equipment, terminal equipment, wireless communication equipment, user agent, or user apparatus. The user equipment may also be a cellular phone, a cordless phone, a Session Initiation Protocol (SIP) phone, a Wireless Local Loop (WLL) station, a Personal Digital Assistant (PDA), a handheld equipment with wireless communication function, a computing equipment or other processing equipment connected to wireless modem, a vehicle-mounted equipment, a wearable equipment, a user equipment in the future 5G network, or a mobile equipment in the future evolved Public Land Mobile Network (PLMN), etc.; embodiments of the present disclosure are not limited thereto.

Figure 2:
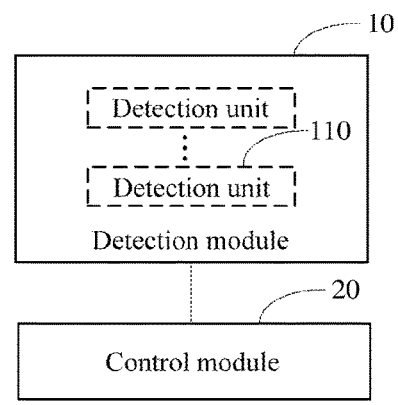
FIG. 2 shows a block diagram of a display brightness control apparatus according to an embodiment of the present disclosure.

Please refer to FIG. 2 which shows a block diagram of a display brightness control apparatus according to an embodiment of the present disclosure.

In a possible implementation, as shown in FIG. 2, the detection module includes one or more detection units 110, and the controlling luminous brightness of the light emitting unit according to the detection current may include:

obtaining a first control signal according to the detection current outputted by the one or more detection units 110, so as to control the luminous brightness of the light emitting unit.

With the above apparatus, in the embodiment of the present disclosure, the luminous brightness of the display panel may be controlled by the detection current outputted by the one or more detection units.

In an example, a plurality of detection units 110 may be used, the plurality of detection units 110 are distributed on a plurality of positions of the thin film transistor unit to obtain a plurality of detection current; and the control module 20 may obtain a control signal according to each of the detection currents, and integrates a plurality of control signals into the first control signal to control the luminous brightness of the display panel. In this way, the display brightness control apparatus provided by an embodiment of the present disclosure may obtain a more accurate first control signal, so as to better adapt to the change of the ambient light.

Of course, in other implementations, only one detection unit may also be used to detect the brightness of the ambient light, which can better reduce the cost and respond to the change in the brightness of the ambient light more quickly.

The detection unit 110 in the embodiment of the present disclosure may include numerous possible implementations. When the detection module 10 includes a plurality of detection units 110, each of the detection units 110 may be the same, or may be different. Possible implementations of the detection unit 110 are described exemplarily below.

Figure 3:
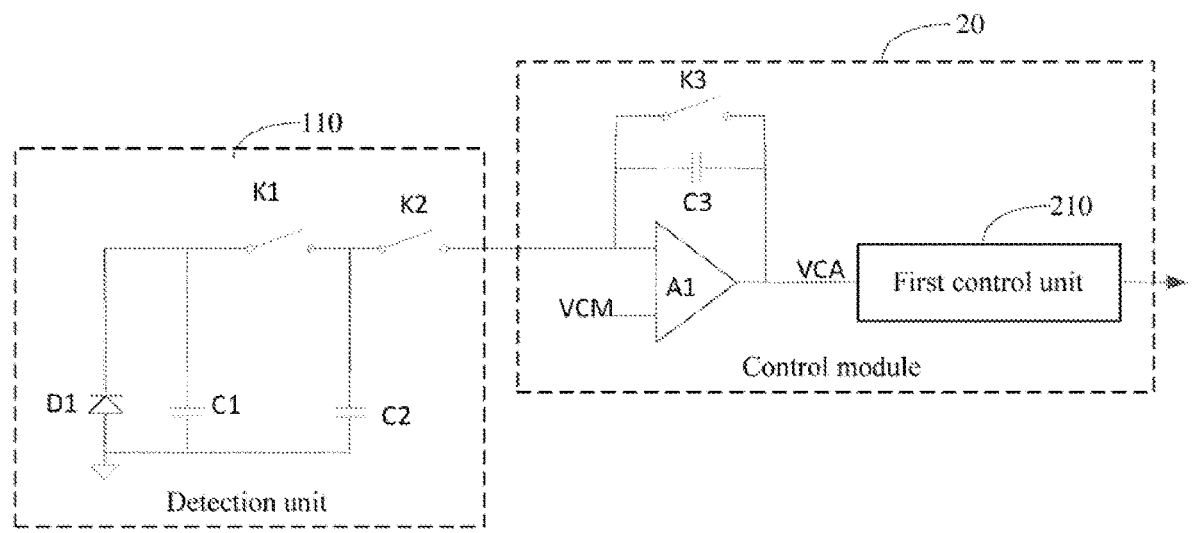
FIG. 3 shows a schematic diagram of a display brightness control apparatus according to an embodiment of the present disclosure.

Please refer to FIG. 3 which shows a schematic diagram of a display brightness control apparatus according to an embodiment of the present disclosure.

In a possible implementation, as shown in FIG. 3, the detection unit 110 may include a first diode D1, a first capacitor C1, a second capacitor C2, a first switch K1, and a second switch K2, wherein, a negative end of the first diode D1 is electrically connected to a first end of the first switch K1 and a first end of the first capacitor C1, a second end of the first switch K1 is electrically connected to a first end of the second switch K2 and a first end of the second capacitor C2, a control end of the first switch K1, a control end of the second switch K2, and a second end of the second switch K2 are electrically connected to the control module (control ends of each of the switches and connection relationships thereof are not shown), and a positive end of the first diode D1, a second end of the first capacitor C1, and a second end of the second capacitor C2 are grounded, wherein the first diode D1 includes a plurality of thin film transistors connected in parallel.

According to an embodiment of the present disclosure, a plurality of thin film transistors are connected in parallel to obtain a first diode D1, and the photosensitive characteristic of the thin film transistors may be used to detect the brightness of the ambient light.

In a possible implementation, as shown in FIG. 3, the control module 20 may include a first operational amplifier A1, a third capacitor C3, a third switch K3, and a first control unit 210, wherein, a first input end of the first operational amplifier A1 is electrically connected to a second end of the second switch K2, a first end of the third capacitor C3, and a first end of the third switch K3, a second input end of the first operational amplifier A1 is used to input a reference signal VCM, an output end of the first operational amplifier is electrically connected to a second end of the third capacitor C3, a second end of the third switch K3, and the first control unit 210, and a control end of the third switch K3 is electrically connected to the first control unit 210:

the first control unit 210 is configured to:

control on states of the first switch K1, the second switch K2, and the third switch K3 through the control end of the first switch, the control end of the second switch, and the control end of the third switch, so as to control the detection unit 110 to obtain the detection current; and obtain the first control signal according to the detection current.

In a possible implementation, the first control unit 210 may include a digital-analog converter, a micro processor MCU, a digital signal processor DSP, etc., so as to convert a voltage signal VCA outputted by the first operational amplifier A1 into the first control signal.

In a possible implementation, the controlling on states of the first switch K1, the second switch K2, and the third switch K3 through the control end of the first switch K1, the control end of the second switch K2, and the control end of the third switch K3 so as to control the detection unit 110 to obtain the detection current may include:

during a first time period when the detection starts, turning on (closing) the first switch K1 and the third switch K3, and turning off (opening) the second switch K2; and when the first time period is reached, turning on the second switch K2, and turning off the first switch K1 and the third switch K3.

During the first time period when the detection starts, when the first switch K1 is turned on and the second switch K2 is turned off, the second capacitor C2 may be charged, and when the third switch K3 is turned on, a setting may be performed on the first operational amplifier A1.

When the first time period is reached, the second switch K2 is turned on, the first switch K1 and the third switch K3 are turned off, the second capacitor C2 begins to be discharged, and the output end of the first operational amplifier A1 outputs the voltage signal VCA, wherein $VCA = i1 * t1 / C3$, i1 being magnitude of the current (i.e. detection current)

inputted to the first input end of the first operational amplifier when the capacitor C2 is discharged, and t1 being detection time.

According to the embodiment of the present disclosure, by controlling on states of the first switch K1, the second switch K2, and the third switch K3 with the first control unit 210, sampling of the detection current may be realized and the corresponding voltage signal may be obtained; and by arranging the first capacitor C1 and the second capacitor C2, the size of the third capacitor C3 may be reduced, thereby saving the space and the cost.

In an example, if a change of the voltage VCA outputted by the first operational amplifier A1 is to be controlled within 2V, the third capacitor is required to be at least 50 pF; and according to the embodiment of the present disclosure, by arranging the first capacitor C1 and the second capacitor C2, the size of the third capacitor C3 may be reduced to 1/10 of its original size.

In an example, the capacitance value of the first capacitor C1 may be 9 times of the capacitance value of the second capacitor C2.

It should be noted that the specific duration of the first time period is not limited by the embodiment of the present disclosure, and may be set by those skilled in the art as needed.

Other possible implementations of the detection unit 110 and the control module 20 are described below.

Figure 4:
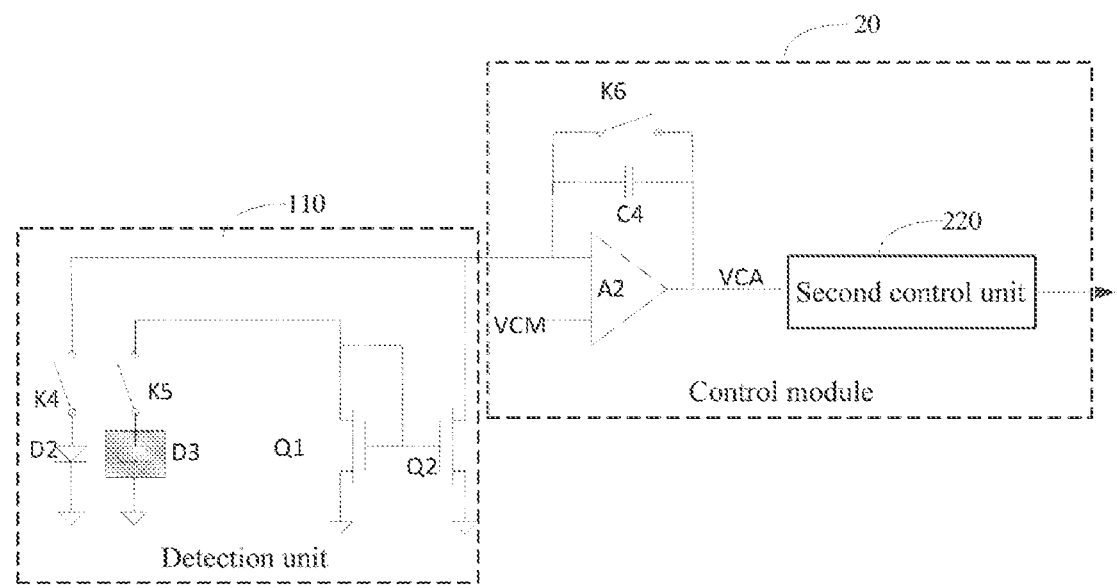
FIG. 4 shows a schematic diagram of a display brightness control apparatus according to an embodiment of the present disclosure.

Please refer to FIG. 4 which shows a schematic diagram of a display brightness control apparatus according to an embodiment of the present disclosure.

In a possible implementation, as shown in FIG. 4, the detection unit 110 includes a second diode D2, a third diode D3, a fourth switch K4, a fifth switch K5, a first transistor Q1, and a second transistor Q2, wherein, a positive end of the second diode D2 is electrically connected to a first end of the fourth switch K4, and a second end of the fourth switch K4 is electrically connected to a drain of the second transistor Q2 and the control module 20, a positive end of the third diode D3 is electrically connected to a first end of the fifth switch K5, and a second end of the fifth switch K5 is electrically connected to a drain of the first transistor Q1, a gate of the first transistor Q1, and a gate of the second transistor Q2, a control end of the fourth switch K4 and a control end of the fifth switch K5 are electrically connected to the control module 20 (control ends of each of the switches and their the connection relationships with the control module are not shown), a negative end of the second diode D2, a negative end of the third diode D3, a source of the first transistor Q1, and a source of the second transistor Q2 are grounded, wherein the second diode D2 and the third diode D3 each includes a plurality of thin film transistors connected in parallel, and the third diode D3 is arranged not to be irradiated by ambient light.

According to the embodiment of the present disclosure, the second diode D2 and the third diode D3 are implemented by a plurality of thin film transistors connected in parallel, the third diode D3 is arranged not to be irradiated by the ambient light, the photosensitive characteristic of the thin film transistors may be used to detect the ambient light, and with the third diode D3 as a reference, the base current present in the thin film transistors themselves may be eliminated, thereby improving the signal-to-noise ratio.

In a possible implementation, as shown in FIG. 4, the control module 20 may include a second operational amplifier A2, a fourth capacitor C4, a sixth switch K6, and a second control unit 220, wherein, a first input end of the second operational amplifier A2 is electrically connected to a second end of the fourth switch K4 and a drain of the second transistor Q2, a second input end of the second operational amplifier A2 is used to input a reference signal VCM, an output end of the second operational amplifier A2 is electrically connected to a second end of the fourth capacitor C4, a second end of the sixth switch K6, and the second control unit 220, and a control end of the sixth switch K6 is electrically connected to the second control unit 220 (control ends and connection relationships thereof are not shown);

the second control unit 220 may be configured to:

control on states of the fourth switch K4, the fifth switch K5, and the sixth switch K6 through the control end of the fourth switch K4, the control end of the fifth switch K5, and the control end of the sixth switch K6, so as to control the detection unit 110 to obtain the detection current; and obtain the first control signal according to the detection current.

In a possible implementation, the controlling on states of the fourth switch K4, the fifth switch K5, and the sixth switch K6 through the control end of the fourth switch K4, the control end of the fifth switch K5, and the control end of the sixth switch K6 so as to control the detection unit 110 to obtain the detection current may include:

during a second time period when a detection starts, turning on the sixth switch, and turning off the fourth switch and the fifth switch; and when the second time period is reached, turning on the fourth switch and the fifth switch, and turning off the sixth switch.

Wherein during the second time period when the detection starts, according to the embodiment of the present disclosure, a setting is performed on the second operational amplifier A2 by turning on the sixth switch and turning off the fourth switch and the fifth switch. When the second time period is reached, according to the embodiment of the present disclosure, by turning on the fourth switch and the fifth switch and turning off the sixth switch, the detection current is obtained by the detection unit 110. Wherein, a light shielding process is performed on the third diode D3, the base current may be outputted, the second diode D2 senses the brightness of the ambient light to output a first current, and a current mirror composed of the first transistor Q1 and the second transistor Q2 obtain a difference between the first current and the base current so as to obtain the detection current. Since the detection current is obtained by removing the base current, the error interference is eliminated and the signal-to-noise ratio is improved.

Of course, in the embodiment of the present disclosure, a difference circuit is described exemplarily by taking the current mirror composed of the first transistor Q1 and the second transistor Q2 as an example, and in other implementations, the difference circuit may also include other elements.

In an example, when the second time period is reached, the fourth switch and the fifth switch are turned on and the sixth switch is turned off, and the output end of the second operational amplifier A2 outputs the voltage signal VCA=i2*t2/C4, where i2 indicates the detection current (a difference current between the first current and the base current) outputted by the detection unit 110, and t2 indicates the single detection time, e.g., 1 μs. If the outputted voltage signal VCA is to be controlled within 2V, the capacitance value of the fourth capacitor C4 may be about 10 pF.

In a possible implementation, the second control unit 220 may include a digital-analog converter, a micro processor MCU, a digital signal processor DSP, etc. so as to convert the voltage signal VCA outputted by the first operational amplifier A1 into the first control signal In a possible implementation, after obtaining the voltage signal VCA, the first control unit 210 and the second control unit 220 may process the voltage signal VCA in the same way. The process on the voltage signal VCA is exemplarily described below, and it should be noted that the following description is applicable to the first control unit 210 and the second control unit 220.

In a possible implementation, after obtaining the voltage signal VCA, the embodiment of the present disclosure may perform analog-digital conversion on the voltage signal VCA to obtain a digital signal corresponding to the voltage signal, the digital signal may be stored in a storage unit (e.g., SRAM); and by invoking a preset light intensity lookup table stored in the storage unit, an ambient light intensity corresponding to the digital signal may be obtained, and the obtained ambient light intensity may be used to obtain the first control signal.

The preset light intensity lookup table may include a correspondence between the voltage (digital signal) and the ambient light intensity; and therefore, after the voltage is obtained, the corresponding ambient light intensity may be found by the voltage.

It should be noted that the specific implementation of obtaining the first control signal by the found ambient light intensity is not limited by the present disclosure, and may be determined by those skilled in the art according to the related technology.

In a possible implementation, when the detection module 10 includes a plurality of detection units, a plurality of control signals may be obtained; and in this case, the embodiment of the present disclosure performs processes such as weighted average on the plurality of control signals to obtain the first control signal, so that the luminous brightness of the display panel responds to the change of the ambient light more accurately.

Of course, the above description is exemplary, and should not be regarded as a limitation to the present disclosure; and in other implementations, other processes may also be performed on the plurality of first control signals, which is not limited by the present disclosure.

It should be noted that since there are various kinds of display panels such as a self-luminous type and a backlight type, the specific way of controlling the luminous intensity of the display panel by the first control signal is not limited by the present disclosure. For example, as for the self-luminous type display panel (e.g., OLED), the first control signal may be used to directly control the luminous brightness of the display panel; and as for the backlight type display panel (e.g., LCD), the first control signal may be used to control the luminous brightness of the backlight layer so as to control the luminous brightness of the display panel.

Figure 5:
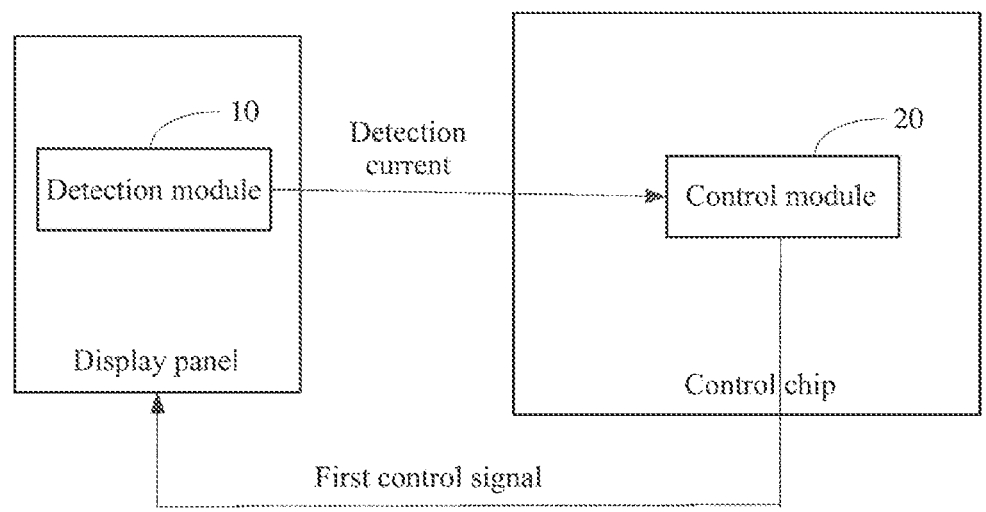
FIG. 5 shows a schematic diagram of a display brightness control apparatus according to an embodiment of the present disclosure.

Please refer to FIG. 5 which shows a schematic diagram of a display brightness control apparatus according to an embodiment of the present disclosure.

As shown in FIG. 5, the detection module 10 may be arranged in the display panel, and the control module 20 may be arranged in a control chip (or referred to as a multiplex control chip); when obtaining the detection current, the detection module 10 transmits the detection current to the control module 20 of the control chip through a new connecting wire, and the control module 20 obtains the first control signal according to the detection current so as to control the luminous brightness of the display panel.

In a possible implementation, the control chip may include any one of a touch and display driver integration, a fingerprint touch and display driver integration, or a fingerprint and display driver integration. That is, the control module 20 may reuse the control chip of the display panel itself to control the detection module and the luminous brightness of the display panel, so that the cost may be saved.

Although embodiments of the present disclosure have been described above, the above descriptions are exemplary but not exhaustive, and are not limited to each of the disclosed embodiments. Many variations and modifications are apparent to those of ordinary skill in the art without departing from the scope and spirit of each of the described embodiments. The selection of the terms used herein is intended to best explain the principles and actual applications of each of the embodiments or its improvements to technology in the market, or to make each of the embodiments disclosed herein understandable to those skilled in the art.

What is claimed is:

1. A display brightness control apparatus, applied to a display panel, the display panel comprising a thin film transistor device and a light emitting device, the apparatus comprising:

a detector, comprising a plurality of thin film transistors in the thin film transistor device, and configured to output a detection current according to brightness of ambient light, wherein the detector comprises one or more detection circuits; and a controller, electrically connected to the detector, and configured to control luminous brightness of the light emitting device according to the detection current, wherein the controller is configured to control the luminous brightness of the light emitting device according to the detection current by operations comprising obtaining a first control signal according to the detection current outputted by the one or more detection circuits to control the luminous brightness of the light emitting device, wherein at least one of the one or more detection circuits comprises a first diode, a first capacitor, a second capacitor, a first switch, and a second switch, wherein:

a negative end of the first diode is electrically connected to a first end of the first switch and a first end of the first capacitor, a second end of the first switch is electrically connected to a first end of the second switch and a first end of the second capacitor, a control end of the first switch, a control end of the second switch, and a second end of the second switch are electrically connected to the controller, and a positive end of the first diode, a second end of the first capacitor, and a second end of the second capacitor are grounded, and wherein the first diode comprises a plurality of thin film transistors connected in parallel, or wherein at least one of the one or more detection circuits comprises a second diode, a third diode, a fourth switch, a fifth switch, a first transistor, and a second transistor, wherein:

a positive end of the second diode is electrically connected to a first end of the fourth switch, and a second end of the fourth switch is electrically connected to a drain of the second transistor and the controller, a positive end of the third diode is electrically connected to a first end of the fifth switch, and a second end of the fifth switch is electrically connected to a drain of the first transistor, a gate of the first transistor, and a gate of the second transistor, a control end of the fourth switch and a control end of the fifth switch are electrically connected to the controller, and a negative end of the second diode, a negative end of the third diode, a source of the first transistor, and a source of the second transistor are grounded, and wherein the second diode and the third diode each comprises a plurality of thin film transistors connected in parallel, and the third diode is arranged not to be irradiated by the ambient light.

2. The apparatus according to claim 1, wherein the controller comprises a first operational amplifier, a third capacitor, a third switch, and a first controller, wherein:

a first input end of the first operational amplifier is electrically connected to a second end of the second switch, a first end of the third capacitor, and a first end of the third switch, a second input end of the first operational amplifier is used to input a reference signal, an output end of the first operational amplifier is electrically connected to a second end of the third capacitor, a second end of the third switch, and the first controller, and a control end of the third switch is electrically connected to the first controller;

the first controller is configured to:

control the detector to obtain the detection current by operations comprising controlling on states of the first switch, the second switch, and the third switch through the control end of the first switch, the control end of the second switch, and the control end of the third switch; and obtain the first control signal according to the detection current.

3. The apparatus according to claim 2, wherein controlling the on states of the first switch, the second switch, and the third switch through the control end of the first switch, the control end of the second switch, and the control end of the third switch comprises:

during a first time period when a detection starts, closing the first switch and the third switch, and opening the second switch; and when the first time period is reached, closing the second switch, and opening the first switch and the third switch.

4. The apparatus according to claim 1, wherein the controller comprises a second operational amplifier, a fourth capacitor, a sixth switch, and a second controller, wherein:

a first input end of the second operational amplifier is electrically connected to the second end of the fourth switch and a drain of the second transistor, a second input end of the second operational amplifier is used to input a reference signal, an output end of the second operational amplifier is electrically connected to a second end of the fourth capacitor, a second end of the sixth switch, and the second controller, and a control end of the sixth switch is electrically connected to the second controller;

the second controller is configured to:

control the detector to obtain the detection current by operations comprising controlling on states of the fourth switch, the fifth switch, and the sixth switch through the control end of the fourth switch, the control end of the fifth switch, and the control end of the sixth switch, so as to; and obtain the first control signal according to the detection current.

5. The apparatus according to claim 4, wherein controlling the on states of the fourth switch, the fifth switch, and the sixth switch through the control end of the fourth switch, the control end of the fifth switch, and the control end of the sixth switch comprises:

during a second time period when a detection starts, closing the sixth switch, and opening the fourth switch and the fifth switch; and when the second time period is reached, closing the fourth switch and the fifth switch, and opening the sixth switch.

6. The apparatus according to claim 1, wherein the controller is arranged in at least one of a touch and display driver integration chip, a fingerprint touch and display driver integration chip, or a fingerprint and display driver integration chip.

7. An electronic device, comprising a display brightness control apparatus and a display panel, wherein the display panel comprises a thin film transistor device and a light emitting device, and the display brightness control apparatus is applied to the display panel and comprises:

a detector, comprising a plurality of thin film transistors in the thin film transistor device, and configured to output a detection current according to brightness of ambient light, wherein the detector comprises one or more detection circuits; and a controller, electrically connected to the detector, and configured to control luminous brightness of the light emitting device according to the detection current, wherein the controller is configured to control the luminous brightness of the light emitting device according to the detection current by operations comprising obtaining a first control signal according to the detection current outputted by the one or more detection circuits to control the luminous brightness of the light emitting device, wherein at least one of the one or more detection circuits comprises a first diode, a first capacitor, a second capacitor, a first switch, and a second switch, wherein:

a negative end of the first diode is electrically connected to a first end of the first switch and a first end of the first capacitor, a second end of the first switch is electrically connected to a first end of the second switch and a first end of the second capacitor, a control end of the first switch, a control end of the second switch, and a second end of the second switch are electrically connected to the controller, and a positive end of the first diode, a second end of the first capacitor, and a second end of the second capacitor are grounded, and wherein the first diode comprises a plurality of thin film transistors connected in parallel, or wherein at least one of the one or more detection circuits comprises a second diode, a third diode, a fourth switch, a fifth switch, a first transistor, and a second transistor, wherein:

a positive end of the second diode is electrically connected to a first end of the fourth switch, and a second end of the fourth switch is electrically connected to a drain of the second transistor and the controller, a positive end of the third diode is electrically connected to a first end of the fifth switch, and a second end of the fifth switch is electrically connected to a drain of the first transistor, a gate of the first transistor, and a gate of the second transistor, a control end of the fourth switch and a control end of the fifth switch are electrically connected to the controller, and a negative end of the second diode, a negative end of the third diode, a source of the first transistor, and a source of the second transistor are grounded, and wherein the second diode and the third diode each comprises a plurality of thin film transistors connected in parallel, and the third diode is arranged not to be irradiated by the ambient light.

8. The electronic device according to claim 7, wherein the controller comprises a first operational amplifier, a third capacitor, a third switch, and a first controller, wherein:

a first input end of the first operational amplifier is electrically connected to a second end of the second switch, a first end of the third capacitor, and a first end of the third switch, a second input end of the first operational amplifier is used to input a reference signal, an output end of the first operational amplifier is electrically connected to a second end of the third capacitor, a second end of the third switch, and the first controller, and a control end of the third switch is electrically connected to the first controller;

the first controller is configured to:
control the detector to obtain the detection current by operations comprising controlling on states of the first switch, the second switch, and the third switch through the control end of the first switch, the control end of the second switch, and the control end of the third switch; and obtain the first control signal according to the detection current.

9. The electronic device according to claim 8, wherein controlling the on states of the first switch, the second switch, and the third switch through the control end of the first switch, the control end of the second switch, and the control end of the third switch comprises:

during a first time period when a detection starts, closing the first switch and the third switch, and opening the second switch; and when the first time period is reached, closing the second switch, and opening the first switch and the third switch.

10. The electronic device according to claim 7, wherein the controller comprises a second operational amplifier, a fourth capacitor, a sixth switch, and a second controller, wherein:

a first input end of the second operational amplifier is electrically connected to the second end of the fourth switch and a drain of the second transistor, a second input end of the second operational amplifier is used to input a reference signal, an output end of the second operational amplifier is electrically connected to a second end of the fourth capacitor, a second end of the sixth switch, and the second controller, and a control end of the sixth switch is electrically connected to the second controller;

the second controller is configured to:
control the detector to obtain the detection current by operations comprising controlling on states of the fourth switch, the fifth switch, and the sixth switch through the control end of the fourth switch, the control end of the fifth switch, and the control end of the sixth switch; and obtain the first control signal according to the detection current.

11. The electronic device according to claim 10, wherein controlling the on states of the fourth switch, the fifth switch, and the sixth switch through the control end of the fourth switch, the control end of the fifth switch, and the control end of the sixth switch comprises:

during a second time period when a detection starts, closing the sixth switch, and opening the fourth switch and the fifth switch; and when the second time period is reached, closing the fourth switch and the fifth switch, and opening the sixth switch.

12. The electronic device according to claim 7, wherein the controller is arranged in any one of a touch and display driver integration chip, a fingerprint touch and display driver integration chip, or a fingerprint and display driver integration chip.

13. The electronic device according to claim 7, wherein the display panel comprises at least one of a liquid crystal display panel, a light-emitting diode display panel, an organic light-emitting diode display panel, or a micro-light-emitting diode display panel.

* * * * *